United States Patent [19]

Bartlett

[11] 4,016,653
[45] Apr. 12, 1977

[54] SIGHTING DEVICE FOR A VEHICLE
[76] Inventor: Joseph E. Bartlett, 215 S. Parker Ave., Olathe, Kans. 66601
[22] Filed: July 11, 1975
[21] Appl. No.: 595,327
[52] U.S. Cl. .................................. 33/264; 116/28 R
[51] Int. Cl.$^2$ .................. G01C 21/04; B60Q 1/26
[58] Field of Search .................. 33/264, 286, 243; 116/28 R

[56] References Cited
UNITED STATES PATENTS

| | | | |
|---|---|---|---|
| 1,610,477 | 12/1926 | Sanford | 33/264 |
| 1,834,682 | 12/1931 | Colstad | 33/264 |
| 1,871,532 | 8/1932 | Kenna | 33/264 |
| 2,360,368 | 10/1944 | Rubissow | 33/264 |
| 2,553,540 | 5/1951 | Beckerman | 33/243 |
| 2,553,963 | 5/1951 | Dzus | 33/264 |
| 2,584,777 | 2/1952 | Adolfson | 33/264 |

Primary Examiner—Richard E. Aegerter
Assistant Examiner—Richard R. Stearns
Attorney, Agent, or Firm—Lowe, Kokjer, Kircher, Wharton & Bowman

[57] ABSTRACT

A sighting device is mounted within the driver's compartment of a vehicle to assist in the accurate driving of the vehicle. A sight member provided with an opening is carried on one end of a telescopically extensible arm. The extensible arm and a swivel connection permit the sight member to be adjusted to a position in which it may be sighted through toward the dividing line of the road to give the vehicle driver an indication of the position of the vehicle relative to the center of the lane in which it is driven. A tinted glass for reducing glare and shimmer is removably mounted to overlie the opening by a clamp device.

1 Claim, 4 Drawing Figures

SIGHTING DEVICE FOR A VEHICLE

BACKGROUND AND SUMMARY OF THE INVENTION

This invention relates to a sighting device for a vehicle which assists the driver in accurately driving the vehicle along a road.

Drivers inexperienced in handling recreational type vehicles and other large vehicles encounter considerable difficulty in maintaining the vehicle centered in the lane in which it is driven. Since most of these vehicles are much longer and wider than automobiles, the vision of the driver is blocked to the rear and there is much greater likelihood for steering error than in the case of automobiles. It is presently necessary for the driver to rather frequently check the outboard rear view mirrors to see that the vehicle is remaining within its lane, and this distracts from the driver's concentration on the road ahead.

In view of the increasing extent to which large vehicles such as motor homes, "campers," and the like are being driven by persons inexperienced in handling vehicles of this size, serious safety problems have arisen and have increased rapidly in recent years. There is a tendency for nearly all new drivers to occasionally drive off the road and onto the right shoulder. When rough or soft shoulders are encountered, this can be dangerous. Accordingly, there is a need to provide a means for increasing the driving accuracy of large vehicles in order to reduce the potential for highway accidents. It is the primary goal of the present invention to meet this need.

More specifically, it is an object of the invention to provide a sighting device which assists the driver of a vehicle in maintaining the vehicle in the center of the lane in which it is being driven, and thus permits more relaxed driving to lessen driver fatigue and nervousness.

Another object of the invention is to provide a sighting device of the character described which is easily adjustable in position in order to accommodate different drivers and which is mounted at a location where it may be viewed without distracting the driver's attention from the road.

A further object of the invention is to provide a sighting device of the character described that may be quickly and easily installed in the driver's compartment of various vehicles at a readily accessible location.

Yet another object of the invention is to provide a sighting device of the character described that includes means for attaching a tinted transparent shield so as to reduce the effects of glare and shimmering light.

An additional object of the invention is to provide a sighting device of the character described that is constructed simply and economically.

Other and further objects of the invention together with the features of novelty appurtenant thereto, will appear in the course of the following description of the drawings.

DETAILED DESCRIPTION OF THE INVENTION

In the accompanying drawings which form a part of the specification and are to be read in conjunction therewith, and in which like reference numerals are employed to indicate like parts in the various views.

Figure 1:
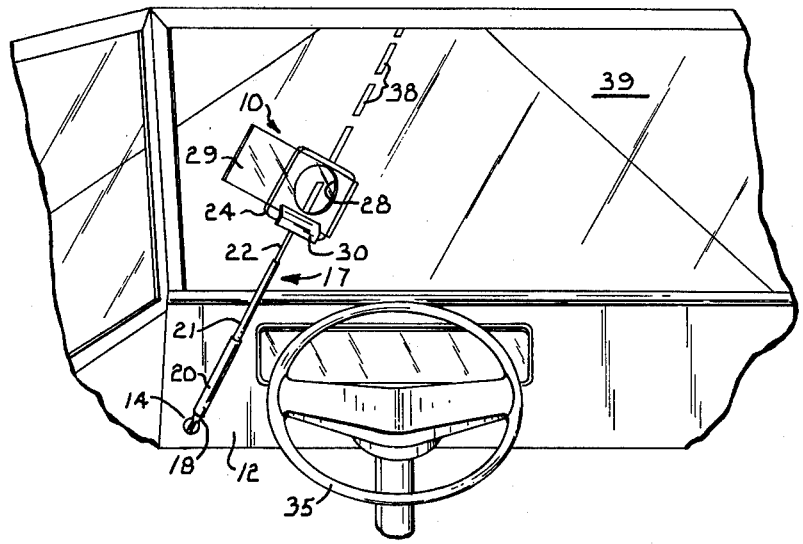
FIG. 1 is a perspective view illustrating a device constructed in accordance with the invention shown mounted on the dashboard of a vehicle positioned to assist in the accurate driving of the vehicle along a road.
Figure 2:
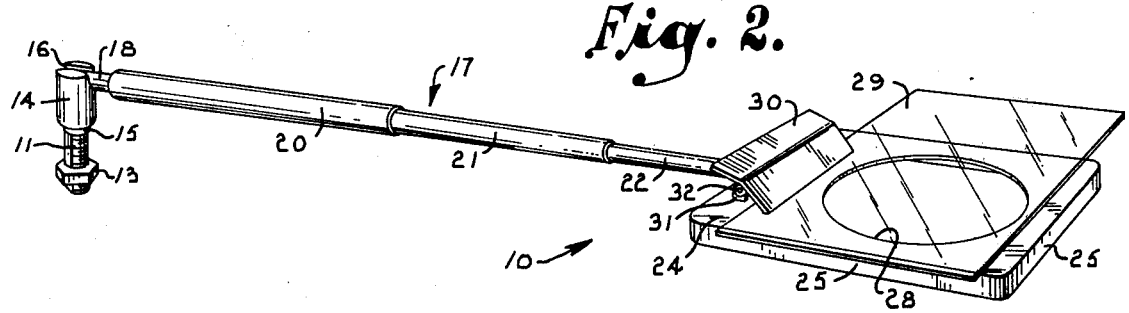
FIG. 2 is a perspective view on an enlarged scale of the sighting device shown in FIG. 1 detached from the dash-board.
Figure 3:
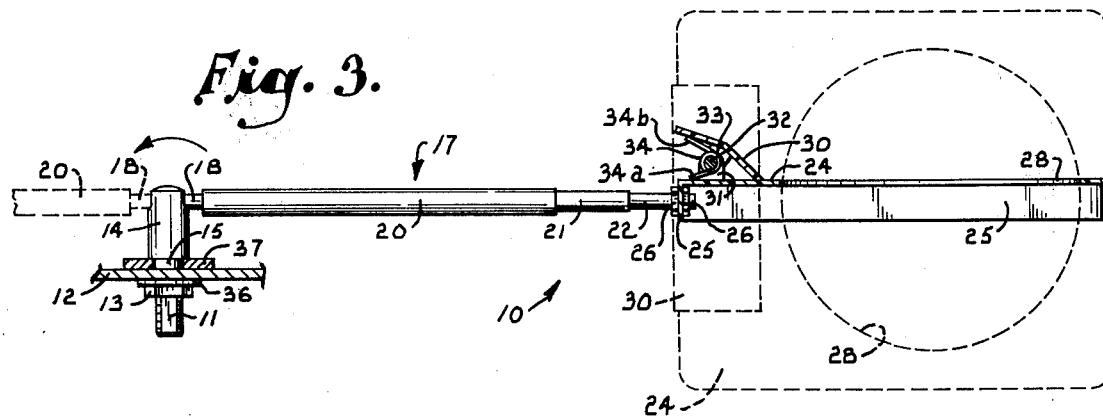
Figure 4:
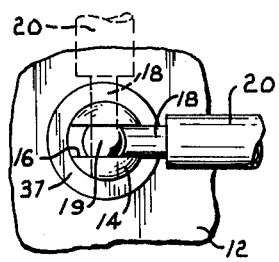

FIG. 3 is a side elevational view on an enlarged scale of the sighting device shown in FIG. 1 mounted on a fragment of the dashboard with the telescopic arm member retracted from the positions shown in FIGS. 1 and 2, the broken lines indicating pivotal movement of the sight board and the arm member; and FIG. 4 is a fragmentary front elevational view on a still larger scale illustrating the connection of the arm member to the swivel connection, the broken lines indicating pivotal movement of the swivel connection and arm member.

Referring now to the drawing in detail, numeral 10 generally designates a sighting device constructed according to a preferred embodiment of the invention. With reference to FIGS. 2 and 3, the sighting device 10 includes a short cylindrical mounting member 11 which is adapted to be mounted to a dashboard 12 within the driver's compartment of a vehicle. Member 11 is threaded for approximately one half of its length on one end in order to receive a nut 13 which is used to secure it to dashboard 12.

A swivel connection 14 is mounted on the end of member 11 opposite the threaded end. A central cylindrical portion 15 of member 11 is located between the threads and swivel connection 14. Portion 15 is slightly larger in diameter than the threaded area of member 11 and is smaller in diameter than the swivel connection. Swivel connection 14 is generally tubular and is secured over the end of member 11 in a manner that permits it to rotate about the axis of member 11 through at least 180°. The swivel connection is frictionally retained in the particular rotative position to which it is moved, although it may be easily rotated to a different position on member 11 when desired.

The end of swivel connection 14 remote from the threads of member 11 is solid and is provided with a transverse slot 16. An elongate, telescopic arm, generally designated by numeral 17, has a cylindrical end portion 18 which is received in slot 16. As best illustrated in FIG. 4, end portion 18 has a ball 19 on its end which fits in a mating socket formed in the slot area of swivel connection 14, thereby providing a ball and socket joint which permits arm 17 to pivot through 180° about an axis perpendicular to member 11 and to slot 16, as indicated by the arrow in FIG. 3.

Arm 17 includes a tubular section 20 which connects to end portion 18 and extends away from swivel connection 14. Section 20 is greater in diameter than the end portion 18. A central telescopic section 21 of arm 17 extends coaxially with section 20 and is sufficiently small in diameter to fit within section 20 in a telescopic manner. The central section 21 is tubular in order to telescopically receive a cylindrical rod section 22 which extends to the end of arm 17. Sections 20, 21 and 22 are coaxial with one another, and arm 17 is thus a straight, elongate member constructed such that its length may be varied by adjusting the telescopic sections in the usual manner. The arm may be shortened by retracting the telescopic sections one within the other, and it may be lengthened by extending the telescopic sections. Preferably, the length of arm 17 may be varied anywhere from 8 to 20 inches. The fit between sections 20, 21 and 22 is sufficiently close to normally retain the sections in the relative positions in which they are set.

A thin sight board 24 of substantially square shape with rounded corners is carried on the end of rod section 22. Board 24 is formed with integral flanges 25 which are turned at right angles from the edges of the board. One of the flanges 25 is apertured to receive the end of rod section 22 which is threaded in order to receive a pair of nuts 26 that are tightening against the opposite sides of flange 25 to secure board 24 on the end of arm 17 remote from swivel connection 14. Rod section 22 is preferably able to pivot within the central section 21 such that the pivotal position of board 24 with respect to the axis arm 17 may be adjusted. Alternatively, board 24 may be mounted to pivot on rod section 22 about the axis of arm 17.

A circular opening 28 is formed through board 24 at a location offset slightly from the center of the board. The vehicle driver sights through opening 28 in a manner that will be described in more detail. Preferably, the diameter of opening 28 is in the range of 2 to 4 inches.

A removable transparent pane 29 is optionally provided for the purpose of reducing the glare or shimmer when the driver sights through opening 28. Pane 29 may be tinted safety glass or plastic, and the pane is preferably substantially rectangular, although its shape is unimportant. The size of pane 29 need only be large enough to cover opening 28, but preferably it may be larger than the board 24 as shown in FIGS. 1 and 2 in order to provide a larger glare reducing surface.

A clamp device is provided to retain pane 29 in place on board 24. The clamp includes a plate 30 which is bent along a straight line near its center such that its two sections are angled relative to one another, as best shown in FIG. 3. A pair of ear brackets 31 project outwardly from board 24 near the end thereof that is connected to arm 17. Brackets 31 are apertured in order to receive and support the opposite ends of a cylindrical pin 32. Plate 30 is provided with a pair of brackets 33 which are apertured and fit over pin 32 to support the plate for pivotal movement about the pin axis. A spring 34 is coiled around pin 32 with one of its ends 34a pushing against board 24 and the other of its ends 34b pushing against the underside of plate 30. Plate 30 is thus biased by spring 34 such that a long edge of the plate is urged against board 24. The anti-glare pane 29 is inserted between board 24 and the edge of plate 30 and is firmly held in place over opening 28 by the clamp. The pane may easily be removed by pressing on the outer portion of plate 30 to move its edge away from board 24 and permit removal of the anti-glare shield.

The sighting device 10 is installed within the driver's compartment of a vehicle by boring a hole in dashboard 12 of a size to receive the threaded portion of member 11. The hole is preferably located to the left of the steering wheel 35 as shown in FIG. 1. Member 11 is then inserted through the hole and nut 13 is tightened down on a washer 36 located against the backside of the dashboard, as shown in FIG. 3. A larger washer 37 is preferably fit over portion 15 between the front surface of the dashboard and swivel connection 14. When device 10 is mounted, swivel connection 14 extends outwardly from dashboard 12 to locate arm 17 a spaced distance away from the dashboard.

In use, the sighting device assists the driver in maintaining the vehicle centered in the lane in which is it driven. To position the device properly, the vehicle is driven down the center of the lane as indicated by referring to the outboard rear view mirror. With the driver in his normal driving position, arm 17 is adjusted until opening 28 is aligned directly between the driver's eyes and the dividing line 38 (FIG. 1) which marks the division between his lane and the next lane to the left. To accomplish this adjustment, arm 17 may be pivoted about the axis of member 11 on swivel connection 14 and may also be telescopically extended or retracted to the desired length. In addition, arm 17 may be pivoted toward and away from the windshield 39 about the ball joint 19, and board 24 may be pivotally adjusted on the end of arm 17 so that the board is oriented perpendicular to the driver's line of vision. The device is thus universally positionable, and opening 28 may be located properly regardless of the size or driving position of the driver.

As the vehicle is driven along the road, the driver intermittently sights through opening 28 toward the dividing line 38. If the dividing line is centered in the opening, the driver knows that the vehicle is centered in its lane. However, if the target line 38 appears to move to the right within the bull's-eye 28, then the driver knows that the vehicle is left of center in its lane and needs to be steered to the right until line 38 is centered in opening 28, at which time the vehicle will again be centered in its lane. Conversely, if the line 38 appears to move to the left within the opening 28, the driver knows to steer to the left until the vehicle is centered in its lane as indicated by the centering of the dividing line in opening 28. If desired, the tinted pane 29 may be inserted in the clamp device and held over the opening 28 to reduce the glare of the sun or oncoming headlights, or to reduce the effects of shimmering light near the road. If an oversized pane 29 is employed, it may extend over the front, or side, or both edges of the board 24 to provide greater protection from glare and yet the pane 29 still need not be in the driver's direct line of vision.

In this manner, sighting device 10 gives the driver an indication of his position and allows him to compensate if the vehicle is off center in its lane. The universal adjustability of arm 17 permits opening 28 to be readily positioned in proper alignment for any driver and for the various driving positions assumed by any one driver. As previously suggested, it is preferred that opening 28 be 2 to 4 inches in diameter because this size is large enough to assure easy sighting through the opening and is small enough that no difficulty is encountered in determining whether dividing line 38 is centered in the opening.

It is important to note that opening 28 is located just a little to the left of the line of sight of the driver as he views the road ahead, as best illustrated in FIG. 1. Therefore, he can sight through the opening with his peripheral vision and need not turn his head as is necessary when checking an outboard rear view mirror. Accordingly, the attention of the driver can remain on the road and any distractions from his concentration as he occassionally glances through opening 28 are minimal.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A sighting device for installation in the driver's compartment of a vehicle to assist in the driving of the vehicle, said sighting device comprising:

an elongate, adjustable arm member having an inner end being adapted for connection to a support within the driver's compartment of the vehicle to mount said arm member therein, said arm member being adjustable to vary the horizontal and vertical position of its outer end;

a sight member mounted on said outer end of the arm member, said sight member presenting an opening therein for alignment with a reference target located remotely of the vehicle to permit said reference target to be sighted through said opening, thereby providing an indication of the position of the vehicle relative to said reference target;

a tinted transparent panel; and means for mounting said panel on said sight member at a position to substantially overlie said opening, said means comprising a clamp plate mounted on said sight member and having an edge biased toward said sight member to retain said panel between said clamp plate and sight member.

* * * * *